US010313900B2

(12) United States Patent
Tsunoda

(10) Patent No.: US 10,313,900 B2
(45) Date of Patent: Jun. 4, 2019

(54) WIRELESS LAN CONTROL DEVICE AND WIRELESS LAN COMMUNICATION SYSTEM

(71) Applicant: Allied Telesis Holdings K.K., Tokyo (JP)

(72) Inventor: Shunichi Tsunoda, Tokyo (JP)

(73) Assignee: ALLIED TELESIS HOLDINGS K.K., Tokyo (JP)

( * ) Notice: Subject to any disclaimer, the term of this patent is extended or adjusted under 35 U.S.C. 154(b) by 124 days.

(21) Appl. No.: 15/656,234

(22) Filed: Jul. 21, 2017

(65) Prior Publication Data

US 2018/0063727 A1 Mar. 1, 2018

(30) Foreign Application Priority Data

Aug. 31, 2016 (JP) .................................. 2016-168690

(51) Int. Cl.
*H04W 24/02* (2009.01)
*H04W 48/08* (2009.01)
*H04J 11/00* (2006.01)
*H04W 84/12* (2009.01)

(52) U.S. Cl.
CPC ......... *H04W 24/02* (2013.01); *H04J 11/0093* (2013.01); *H04W 48/08* (2013.01); *H04W 84/12* (2013.01)

(58) Field of Classification Search
CPC ..... H04W 24/02; H04W 48/08; H04W 88/08; H04W 84/18; H04W 84/12; H04W 80/04; H04W 88/06; H04W 74/08; H04J 11/0093; H02W 84/12; H04L 47/10; H04L 47/35; H04L 47/30; H04L 47/32; H04L 5/1423; H04L 5/16; H04L 2012/5608

USPC ............ 370/235, 282, 310.2, 328, 338, 360
See application file for complete search history.

(56) References Cited

U.S. PATENT DOCUMENTS 6,965,605 B1 * 11/2005 Amos ................. H04W 88/085
370/338
2004/0037258 A1 * 2/2004 Scherzer ............... H04W 28/18
370/338
2004/0105416 A1 * 6/2004 Rue ........................ H04L 41/00
370/338

(Continued)

FOREIGN PATENT DOCUMENTS

JP 2008271011 A 11/2008

*Primary Examiner* — Brenda H Pham
(74) *Attorney, Agent, or Firm* — Brooks Acordia IP Law, PC; Michael Zarrabian

(57) ABSTRACT

A wireless LAN control device connected to a plurality of wireless LAN access points includes a transmission access point specification unit, and a reception access point specification unit. The a transmission access point specification unit specifies one of the plurality of wireless LAN access points as a transmission wireless LAN access point that transmits a signal. The reception access point specification unit specifies all the wireless LAN access points other than the transmission wireless LAN access point out of the plurality of wireless LAN access points as reception wireless LAN access points that start waiting for reception of the signal responsive to a time point of the transmission. When at least one of the reception wireless LAN access points has received the signal, the at least one of the reception wireless LAN access points is determined to neighbor the transmission wireless LAN access point.

8 Claims, 8 Drawing Sheets

(56) References Cited

U.S. PATENT DOCUMENTS

2009/0323581 A1* 12/2009 Masuda .................. H04M 3/20
370/315

* cited by examiner

WIRELESS LAN CONTROL DEVICE AND WIRELESS LAN COMMUNICATION SYSTEM

BACKGROUND OF THE INVENTION

Field of the Invention

The present invention relates to detection of neighboring wireless LAN (Local Area Network) access points.

Description of the Related Art

Hitherto, there is known a wireless LAN including a plurality of wireless LAN access points. There is such a case where a plurality of wireless LAN access points (base stations) are neighboring one another (refer to Abstract of JP 2008-271011 A). It is useful to detect the wireless LAN access points neighboring one another for control of the wireless LAN.

However, how to detect the wireless LAN access points neighboring one another is unknown according to JP 2008-271011 A.

SUMMARY OF THE INVENTION

It is therefore an object of the present invention to detect wireless LAN access points neighboring one another.

According to the present invention, a wireless LAN control device connected to a plurality of wireless LAN access points, includes a transmission access point specification unit that specifies one of the plurality of wireless LAN access points as a transmission wireless LAN access point that transmits a signal, and a reception access point specification unit that specifies all the wireless LAN access points other than the transmission wireless LAN access point out of the plurality of wireless LAN access points as reception wireless LAN access points that start waiting for reception of the signal responsive to a time point of the transmission, wherein, when at least one of the reception wireless LAN access points has received the signal, the at least one of the reception wireless LAN access points is determined to neighbor the transmission wireless LAN access point.

The thus constructed wireless LAN control device is connected to a plurality of wireless LAN access points. A transmission access point specification unit specifies one of the plurality of wireless LAN access points as a transmission wireless I AN access point that transmits a signal. A reception access point specification unit specifies all the wireless LAN access points other than the transmission wireless LAN access point out of the plurality of wireless LAN access points as reception wireless LAN access points that start waiting for reception of the signal responsive to a time point of the transmission. When at least one of the reception wireless LAN access points has received the signal, the at least one of the reception wireless LAN access points is determined to neighbor the transmission wireless LAN access point.

According to the wireless LAN control device of the present invention, the transmission access point specification unit may specify all the plurality of wireless LAN access points one at a time as the transmission wireless LAN access point.

According to the present invention, the wireless LAN control device may include a transmission instruction unit that instructs the transmission wireless LAN access point to transmit the signal, and a reception wait instruction unit that instructs the reception wireless LAN access points to wait for the reception of the signal.

According to the wireless LAN control device of the present invention, the wait for the reception of the signal may start simultaneously with the transmission of the signal.

According to the wireless LAN control device of the present invention, the wait for the reception of the signal may start before the reception of the signal by the at least one of the reception wireless LAN access points.

According to the wireless LAN control device of the present invention, the wait for the reception of the signal may be to enable the at least one of the reception wireless LAN access points to receive a channel for the signal.

According to the wireless LAN control device of the present invention, the signal may be a beacon frame.

According to the present invention, a wireless LAN communication system includes a transmission wireless LAN access point that transmits a signal; and a reception wireless LAN access point that starts waiting for reception of the signal responsive to a time point of the transmission, wherein, when the reception wireless LAN access point has received the signal, the reception wireless LAN access point is determined to neighbor the transmission wireless LAN access point.

According to the thus constructed wireless LAN communication system, a transmission wireless LAN access point transmits a signal. A reception wireless LAN access point starts waiting for reception of the signal responsive to a time point of the transmission. When the reception wireless LAN access point has received the signal, the reception wireless LAN access point is determined to neighbor the transmission wireless LAN access point.

DESCRIPTION OF THE PREFERRED EMBODIMENTS

Hereinafter, a description will be given of an embodiment of the present invention referring to drawings.

Figure 1:
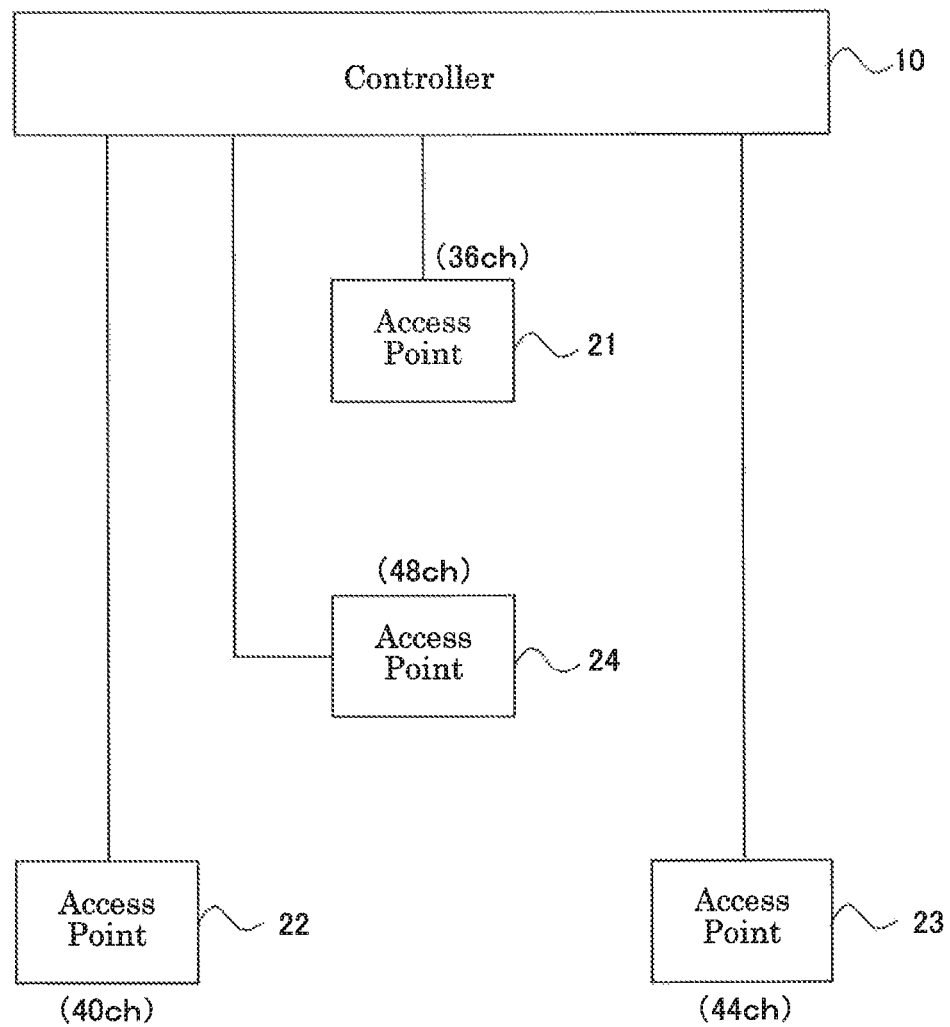
FIG. 1 is a diagram of a configuration of a wireless LAN system according to the embodiment of the present invention.

FIG. 1 is a diagram of a configuration of a wireless LAN system according to the embodiment of the present invention.

The wireless LAN system according to the embodiment of the present invention includes a wireless LAN controller 10, and wireless LAN access points 21, 22, 23, and 24. It should be noted that a notation of "wireless LAN" is omitted, and notations of controller 10, and access points 21, 22, 23, and 24 are used in the figure.

The wireless LAN controller (wireless LAN control device) 10 is connected to the wireless LAN access points 21, 22, 23, and 24 via LAN cables. The wireless LAN controller 10 carries out wired communication with the wireless LAN access points 21, 22, 23, and 24.

The wireless LAN access points 21, 22, 23, and 24 respectively transmit/receive signals in separate channels, respectively. As a result, congestion in the wireless space among the respective wireless LAN access points 21, 22, 23, and 24 is avoided. For example, the wireless LAN access point 21 transmits/receives a signal in a channel 36$ch$. The wireless LAN access point 22 transmits/receives a signal in a channel 40$ch$. The wireless LAN access point 23 transmits/receives a signal in a channel 44$ch$. The wireless LAN access point 24 transmits/receives a signal in a channel 48$ch$.

It should be noted that the wireless LAN access point 24 is assumed to neighbor the wireless LAN access points 21, 22, and 23. However, the wireless LAN access points 21, 22, and 23 are assumed to be remotely separated from one another, and thus not to neighbor one another.

One of the wireless LAN access points 21, 22, 23, and 24 is set to be a transmission wireless LAN access point that transmits a signal (such as a beacon frame). All the wireless LAN access points 21, 22, 23, and 24 other than the transmission wireless LAN access point are set to be reception wireless LAN access points.

All the reception wireless LAN access points start waiting for reception of the signal responsive to the time point of the transmission (for example, simultaneously with the transmission). It should be noted that the wait for the reception of the signal is to enable the reception wireless LAN access point to receive the channel of the signal transmitted by the transmission wireless LAN access point (to carry out the RF scan, for example).

If the one reception wireless LAN access point has received the signal from the transmission wireless LAN access point, the one reception wireless LAN access point determines that the one reception wireless LAN access point is neighboring the transmission wireless LAN access, point.

Figure 5:
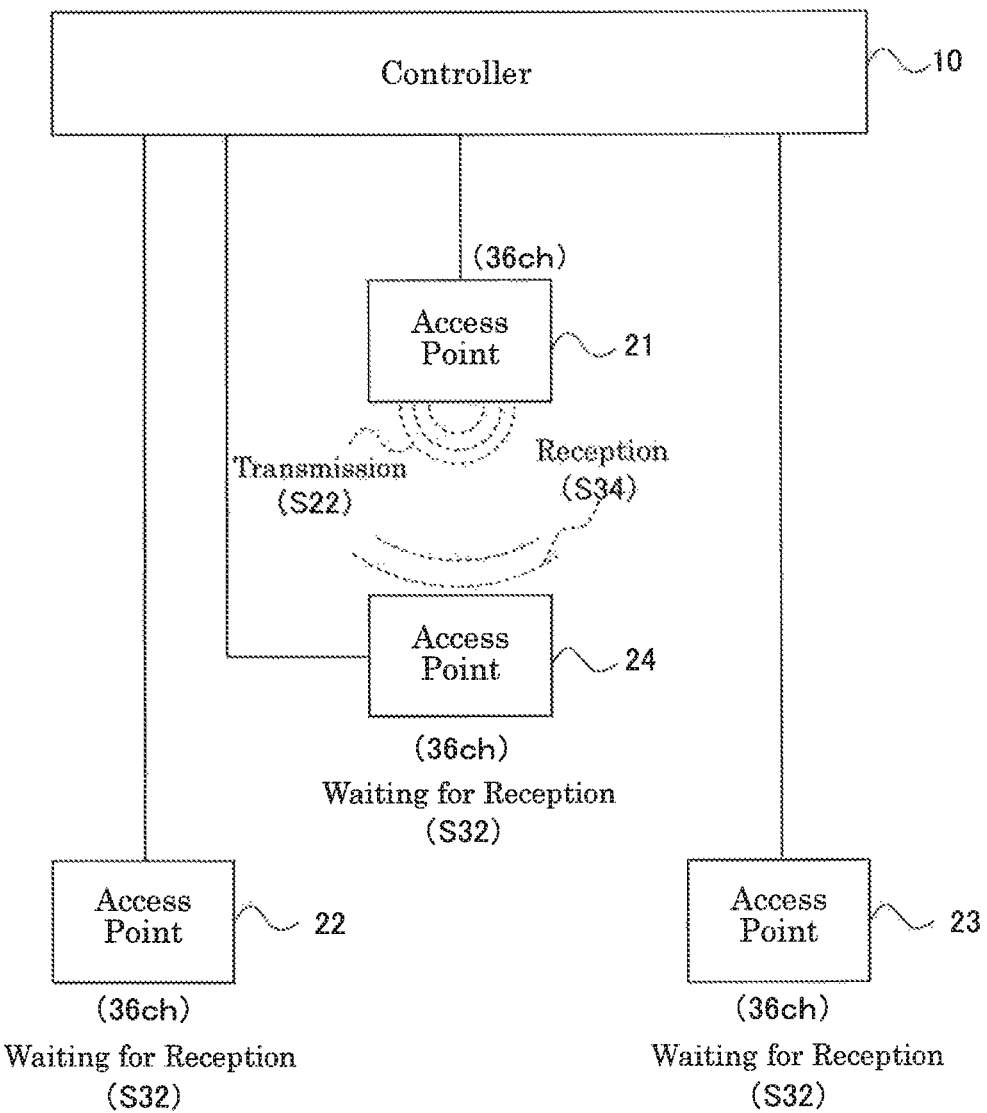
FIG. 5 is a diagram of an operation in a case where the wireless LAN access point 21 is the transmission wireless LAN access point.

FIG. 5 is a diagram of an operation in a case where the wireless LAN access point 21 is the transmission wireless LAN access point.

Referring to FIG. 5, if the wireless LAN access point 21 is the transmission wireless LAN access point, the wireless LAN access points 22, 23, and 24 are the reception wireless LAN access points. The wait for the reception of the signal is to enable the reception wireless LAN access points 22, 23, and 24 to receive the channel 36$ch$ for the signal transmitted by the transmission wireless LAN access point 21. The reception wireless LAN access point 24 can receive the signal from the transmission wireless LAN access point 21, and thus determines that the reception wireless LAN access point 24 is neighboring the transmission wireless LAN access point 21.

Figure 6:
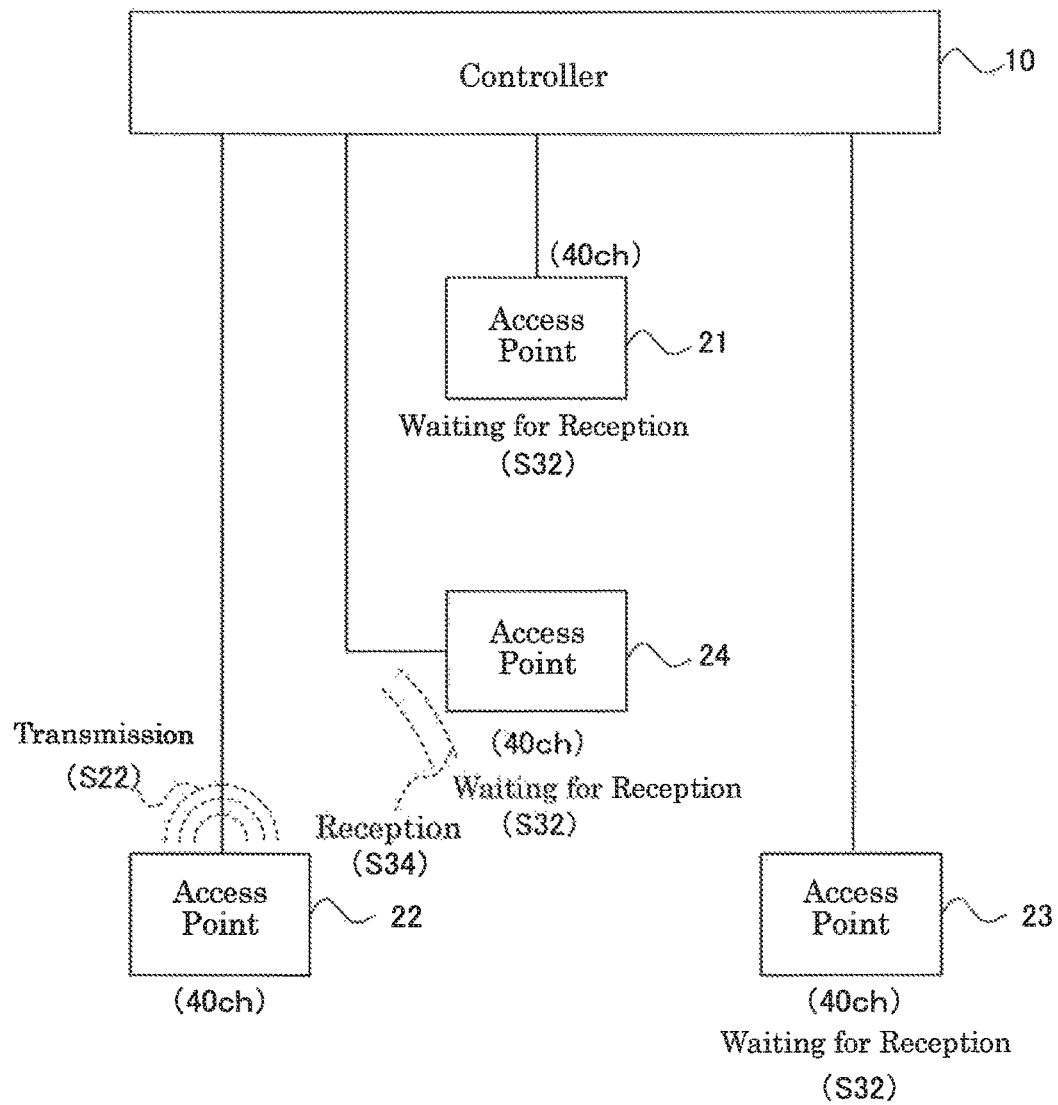
FIG. 6 is a diagram of an operation in a case where the wireless LAN access point 22 is the transmission wireless LAN access point.

FIG. 6 is a diagram of an operation in a case where the wireless LAN access point 22 is the transmission wireless LAN access point.

Referring to FIG. 6, if the wireless LAN access point 22 is the transmission wireless LAN access point, the wireless LAN access points 21, 23, and 24 are the reception wireless LAN access points. The wait for the reception of the signal is to enable the reception wireless LAN access points 21, 23, and 24 to receive the channel 40$ch$ for the signal transmitted by the transmission wireless LAN access point 22. The reception wireless LAN access point 24 can receive the signal from the transmission wireless LAN access point 22, and thus determines that the reception wireless LAN access point 24 is neighboring the transmission wireless LAN access point 22.

Figure 7:
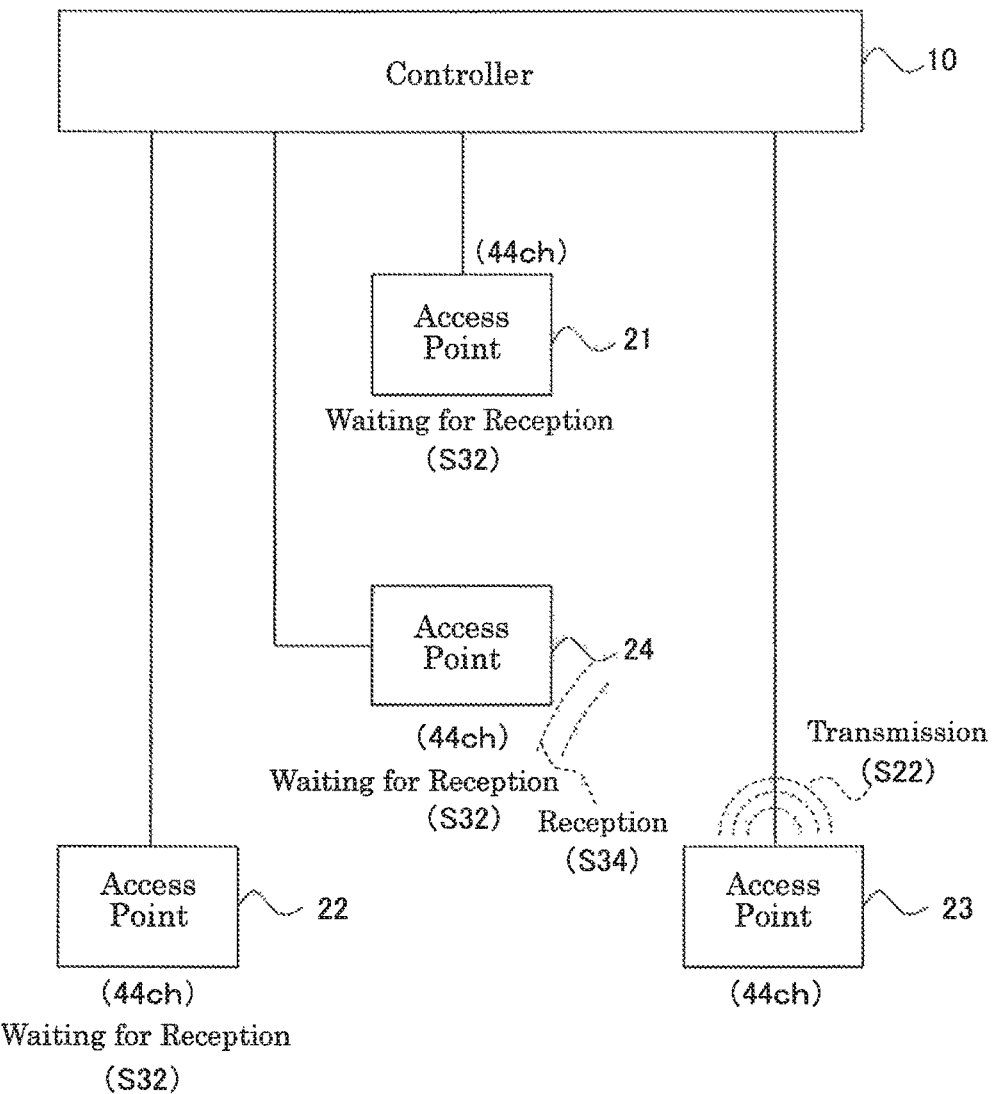
FIG. 7 is a diagram of an operation in a case where the wireless LAN access point 23 is the transmission wireless LAN access point.

FIG. 7 is a diagram of an operation in a case where the wireless LAN access point 23 is the transmission wireless LAN access point.

Referring to FIG. 7, if the wireless LAN access point 23 is the transmission wireless LAN access point, the wireless LAN access points 21, 22, and 24 are the reception wireless LAN access points. The wait for the reception of the signal is to enable the reception wireless LAN access points 21, 22, and 24 to receive the channel 44$ch$ for the signal transmitted by the transmission wireless LAN access point 23. The reception wireless LAN access point 24 can receive the signal from the transmission wireless LAN access point 23, and thus determines that the reception wireless LAN access point 24 is neighboring the transmission wireless LAN access point 23.

Figure 8:
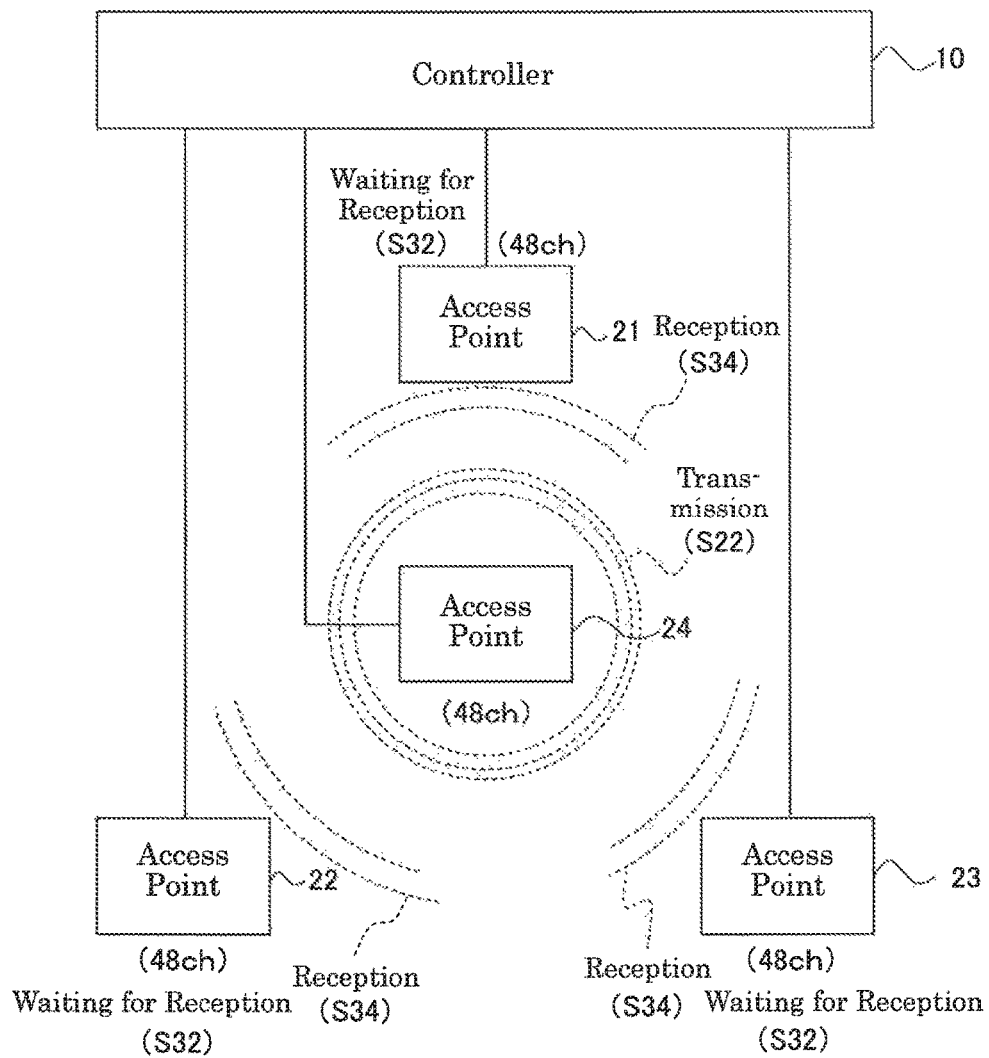
FIG. 8 is a diagram of an operation in a case where the wireless LAN access point 24 is the transmission wireless LAN access point.

FIG. 8 is a diagram of an operation in a case where the wireless LAN access point 24 is the transmission wireless LAN access point.

Referring to FIG. 8, if the wireless LAN access point 24 is the transmission wireless LAN access point, the wireless LAN access points 21, 22, and 23 are the reception wireless LAN access points. The wait for the reception of the signal is to enable the reception wireless LAN access points 21, 22, and 23 to receive the channel 48$ch$ for the signal transmitted by the transmission wireless LAN access point 24. The reception wireless LAN access points 21, 22, and 23 can receive the signal from the transmission wireless LAN access point 24, and thus determine that the reception wireless LAN access points 21, 22, and 23 are neighboring the transmission wireless LAN access point 24.

Figure 2:
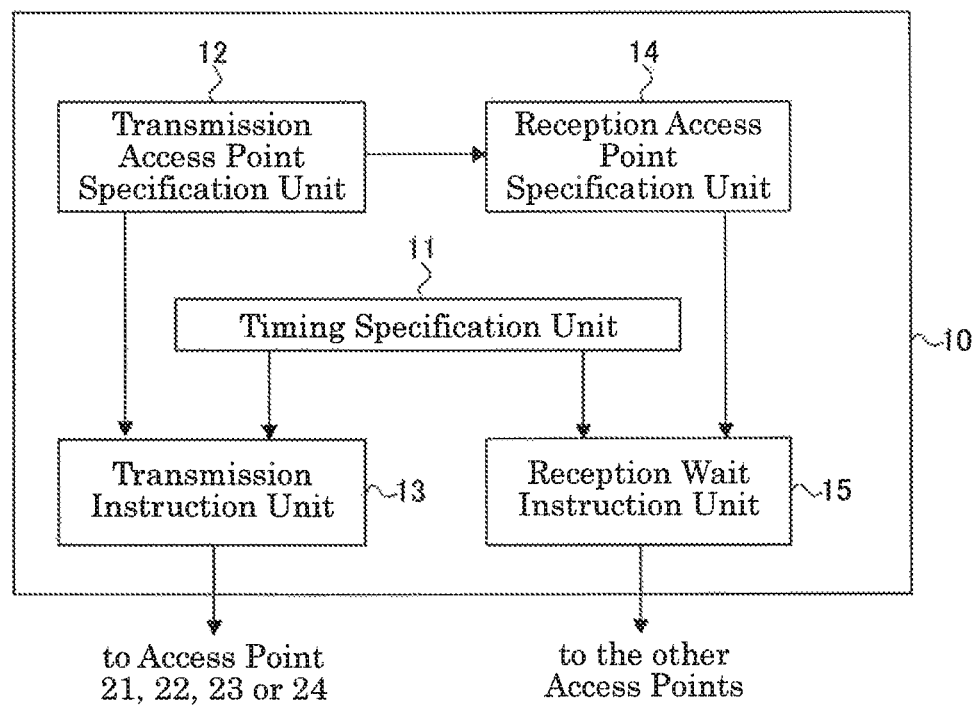
FIG. 2 is a functional block diagram of a configuration of the wireless LAN controller (wireless LAN control device) 10 according to the embodiment of the present invention.

FIG. 2 is a functional block diagram of a configuration of the wireless LAN controller (wireless LAN control device) 10 according to the embodiment of the present invention. The wireless LAN controller (wireless LAN control device) 10 according to the embodiment of the present invention includes a timing specification unit 11, a transmission instruction unit 13, a reception wait instruction unit 15, a transmission access point specification unit 12, and a reception access point specification unit 14.

The timing specification unit 11 specifies a timing, which is a time point at which the signal (such as a beacon frame) is transmitted by the transmission wireless LAN access point and a timing, which is a time point at which the wait for the reception of the signal by the reception wireless LAN access points is started, and provides the transmission instruction unit 13 and the reception wait instruction unit 15 with the timings.

The transmission access point specification unit 12 specifies one of the wireless LAN access points 21, 22, 23, and 24 as the transmission wireless LAN access point. The transmission access point specification unit 12 specifies all the wireless LAN access points 21, 22, 23, and 24 one at a time as the transmission wireless LAN access point. For example, the transmission access point specification unit 12 specifies, in this sequence, the wireless LAN access points 21, 22, 23, and 24 as the transmission wireless LAN access point. The transmission access point specification unit 12 provides the transmission instruction unit 13 and the reception access point specification unit 14 with which wireless LAN access point is specified as the transmission wireless LAN access point.

The reception access point specification unit 14 receives which wireless LAN access point is specified as the transmission wireless LAN access point from the transmission access point specification unit 12, and specifies all the wireless LAN access points 21, 22, 23, and 24 other than the wireless LAN access points which are specified as the transmission wireless LAN access point as the reception wireless LAN access points. The reception access point specification unit 14 provides the reception wait instruction unit 15 with which wireless LAN access points are specified as the reception wireless LAN access points.

The transmission instruction unit 13 receives which wireless LAN access point is specified as the transmission wireless LAN access point from the transmission access point specification unit 12, and instructs the specified transmission wireless LAN access point to transmit the signal (such as a beacon frame). It should be noted that the timing is included in this instruction, and the transmission wireless LAN access point transmits the signal at a time point of this timing.

The reception wait instruction unit 15 receives which wireless LAN access points are specified as the reception wireless LAN access points from the reception access point specification unit 14, and instructs the reception wireless LAN access points to wait for the reception of the signal. It should be noted that the timing is included in this instruction, and the reception wireless LAN access points start waiting for the reception of the signal at a time point of this timing. Moreover, the channel to be used by the transmission wireless LAN access point to transmit the signal may be included in this instruction.

A description will now be given of an operation of the embodiment of the present invention.

Figure 3:
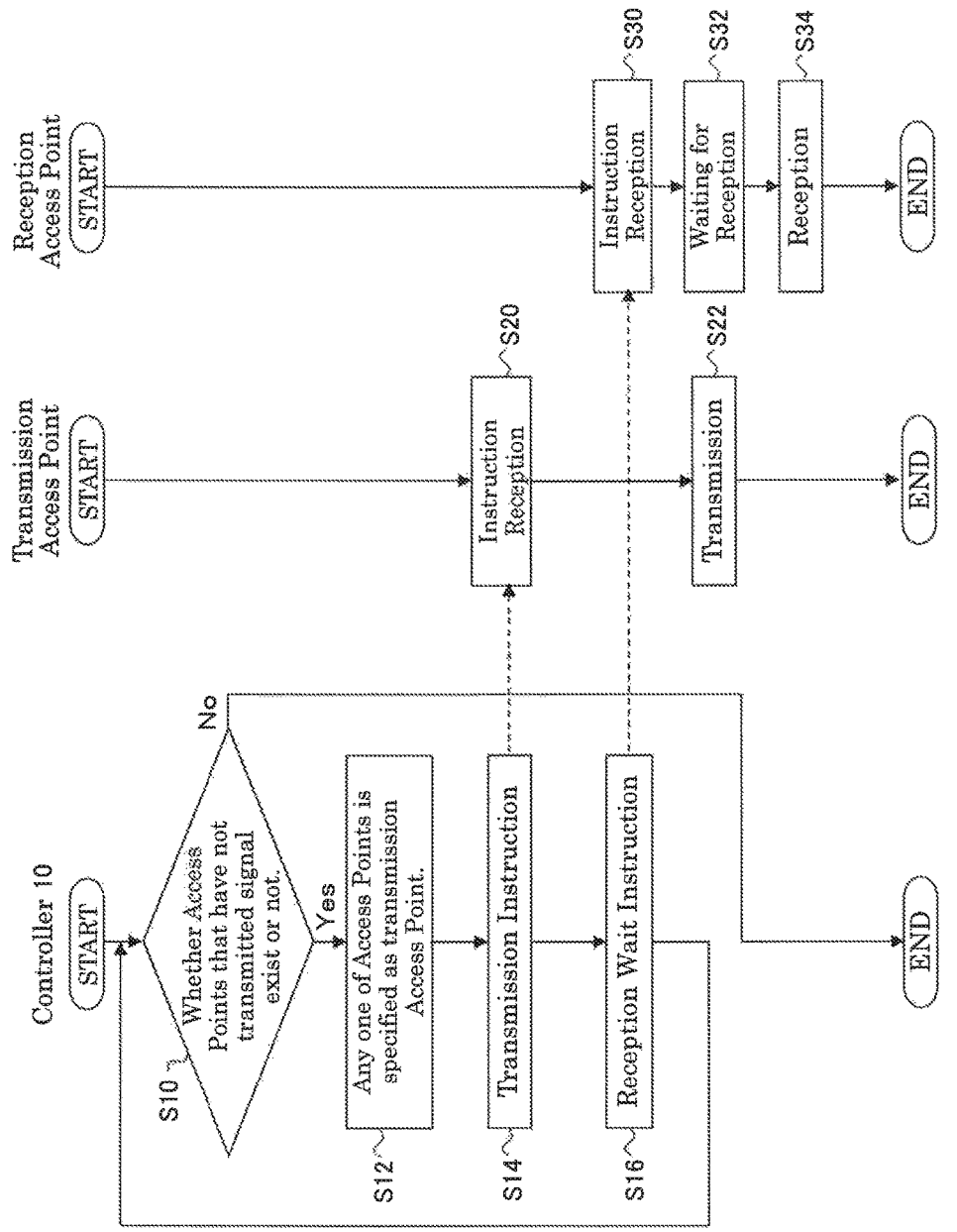
FIG. 3 is a flowchart of the operation of a wireless LAN system according to the embodiment of the present invention.

FIG. 3 is a flowchart of the operation of a wireless LAN system according to the embodiment of the present invention. It should be noted that the operation is divided into respective operations of the wireless LAN controller 10, the transmission wireless LAN access point, and the reception wireless LAN access point, and shown in FIG. 3.

Figure 4:
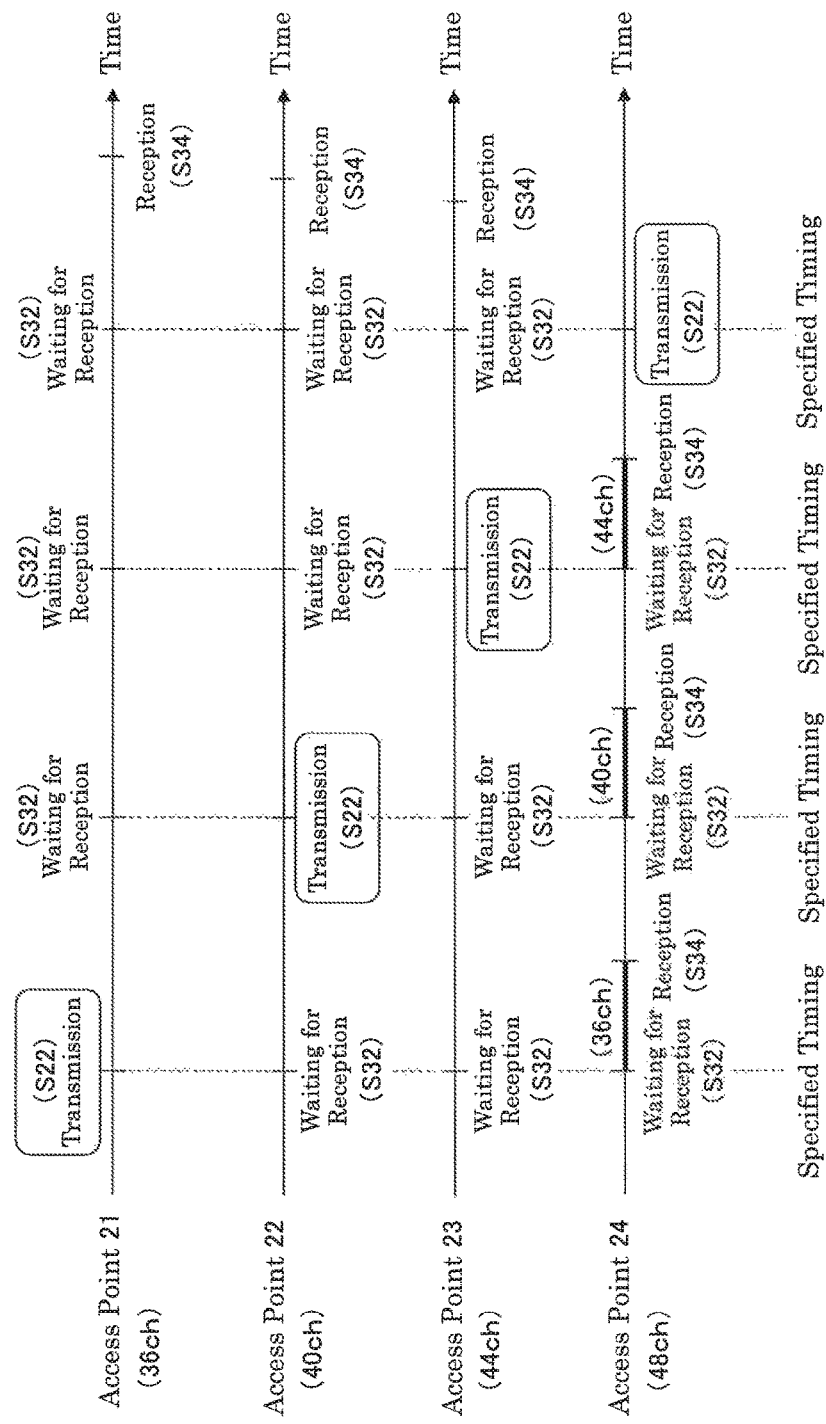
FIG. 4 is a timing chart of the operations of the wireless LAN access points 21, 22, 23, and 24 according to the embodiment of the present invention.

FIG. 4 is a timing chart of the operations of the wireless LAN access points 21, 22, 23, and 24 according to the embodiment of the present invention.

The transmission access point specification unit 12 of the wireless LAN controller 10 determines whether wireless LAN access points that have not transmitted the signal (such as a beacon frame) exist or not (S10). If all the wireless LAN access points 21, 22, 23, and 24 have transmitted the signal (No in S10), the wireless LAN controller 10 finishes the processing.

If there are wireless LAN access points that have not transmitted the signal yet (Yes in S10), the transmission access point specification unit 12 specifies any one of the wireless LAN access points that has not transmitted the signal yet as the transmission wireless LAN access point (S12).

Then, the transmission instruction unit 13 receives which wireless LAN access point is specified as the transmission wireless LAN access point from the transmission access point specification unit 12, and instructs the specified transmission wireless LAN access point to transmit the signal (S14). The transmission wireless LAN access point receives the transmission instruction (S14) from the wireless LAN controller 10 through a wired communication (S20). The transmission instruction (S14) and the instruction reception (S20) are approximately simultaneous with each other.

It should be noted that the transmission instruction (S14) includes the timing (namely the time point of the transmission of the signal) specified by the timing specification unit 11.

The reception access point specification unit 14 receives which wireless LAN access point is specified as the transmission wireless LAN access point from the transmission access point specification unit 12, and specifies all the wireless LAN access points 21, 22, 23, and 24 other than the wireless LAN access points which are specified as the transmission wireless LAN access point as the reception wireless LAN access points.

Then, the reception wait instruction unit 15 of the wireless LAN controller 10 receives which wireless LAN access points are specified as the reception wireless LAN access points from the reception access point specification unit 14, and instructs the reception wireless LAN access points to wait for the reception of the signal (S16). The reception wireless LAN access points receive the reception wait instruction (S16) from the wireless LAN controller 10 through a wired communication (S30). The reception wait instruction (S16) and the instruction reception (S30) are approximately simultaneous with each other.

It should be noted that the reception wait instruction (S16) includes the timing (namely, the time point of the start of the wait for the reception of the signal) specified by the timing specification unit 11.

After the reception wait instruction (S16), the wireless LAN controller 10 returns to the determination (S10) with respect to whether wireless LAN access points that have not transmitted the signal exist or not.

The transmission wireless LAN access point transmits the signal at the specified timing (S22). Simultaneously, all of the reception wireless LAN access points start waiting for the reception of the signal (S32), and finally receives the signal (S34). When at least one of the reception wireless LAN access points receives the signal, the at least one of the reception wireless LAN access points determines that the at least one of the reception wireless LAN access points is neighboring the transmission wireless LAN access point.

It should be noted that if any one of the reception wireless LAN access points is not neighboring the transmission wireless LAN access point, the reception wireless LAN access point cannot receive the signal. In order to handle this state, it is only necessary to cancel the wait for the reception when the signal cannot be received in a predetermined period after the start of the wait for the reception of the signal.

For example, it is assumed that none of the wireless LAN access points 21, 22, 23, and 24 has not transmitted the signal (such as a beacon frame) in the configuration shown in FIG. 1 (Yes in S10). On this occasion, the transmission access point specification unit 12 specifies, for example, the wireless LAN access point 21 as the transmission wireless LAN access point (S12) (refer to FIG. 5). The reception access point specification unit 14 specifies the wireless LAN access points 22, 23, and 24 other than the wireless LAN access point 21 as the reception wireless LAN access points.

The transmission instruction unit 13 instructs the transmission wireless LAN access point 21 to transmit the signal (S14), and the transmission wireless LAN access point 21 receives the instruction (S20). It should be noted that the transmission instruction (S14) includes the timing (namely the time point of the transmission of the signal) specified by the timing specification unit 11.

The reception wait instruction unit 15 instructs the reception wireless LAN access points 22, 23, and 24 to wait for the reception of the signal (S16), and the reception wireless LAN access points 22, 23, and 24 receive the instruction (S30). It should be noted that the reception wait instruction (S14) includes the timing (namely, the time point of the start of the wait for the reception of the signal) specified by the timing specification unit 11.

Referring to FIGS. 4 and 5, when the specified timing is reached, the transmission wireless LAN access point 21 transmits the signal in the channel 36$ch$ (S22), and the reception wireless LAN access points 22, 23, and 24 start waiting for the reception of the signal (S32). In other words, the reception wireless LAN access points 22, 23 and 24 carry out the RF scan so as to receive the signal in the channel 36$ch$. Finally, the reception wireless LAN access point 24 receives the signal (S34), and determines that the reception wireless LAN access point 24 is neighboring the transmission wireless LAN access point 21.

On this occasion, it should be noted that a period in which the reception wireless LAN access point 24 can receive the channel 36$ch$ (a period in which the channel 48$ch$ for the normal operation cannot be used) is limited to a short period from the transmission of the signal by the transmission wireless LAN access point 21 (S22) to the reception of the signal by the reception wireless LAN access point 24 (S34) (refer to FIG. 4).

Then, the transmission access point specification unit 12 specifies the wireless LAN access point 22, for example, out of the wireless LAN access points 22, 23, and 24 that have not transmitted the signal (Yes in S10) as the transmission wireless LAN access point (S12) (refer to FIG. 6). The reception access point specification unit 14 specifies the wireless LAN access points 21, 23, and 24 other than the wireless LAN access point 22 as the reception wireless LAN access points.

The transmission instruction unit 13 instructs the transmission wireless LAN access point 22 to transmit the signal (S14), and the transmission wireless LAN access point 22 receives the instruction (S20). It should be noted that the transmission instruction (S14) includes the timing (namely the time point of the transmission of the signal) specified by the timing specification unit 11.

The reception wait instruction unit 15 instructs the reception wireless LAN access points 21, 23, and 24 to wait for the reception of the signal (S16), and the reception wireless LAN access points 21, 23, and 24 receive the instruction (S30). It should be noted that the reception wait instruction (S16) includes the timing (namely the time point of the start of the wait for the reception of the signal) specified by the timing specification unit 11.

Referring to FIGS. 4 and 6, when the specified timing is reached, the transmission wireless LAN access point 22 transmits the signal in the channel 40$ch$ (S22), and the reception wireless LAN access points 21, 23, and 24 start waiting for the reception of the signal (S32). In other words, the reception wireless LAN access points 21, 23 and 24 carry out the RF scan so as to receive the signal in the channel 40$ch$. Finally, the reception wireless LAN access point 24 receives the signal (S34), and determines that the reception wireless LAN access point 24 is neighboring the transmission wireless LAN access point 22.

On this occasion, it should be noted that a period in which the reception wireless LAN access point 24 can receive the channel 40$ch$ (a period in which the channel 48$ch$ for the normal operation cannot be used) is limited to a short period from the transmission of the signal by the transmission wireless LAN access point 22 (S22) to the reception of the signal by the reception wireless LAN access point 24 (S34) (refer to FIG. 4).

Then, the transmission access point specification unit 12 specifies the wireless LAN access point 23, for example, out of the wireless LAN access points 23 and 24 that have not transmitted the signal (Yes in S10) as the transmission wireless LAN access point (S12) (refer to FIG. 7). The reception access point specification unit 14 specifies the wireless LAN access points 21, 22, and 24 other than the wireless LAN access point 23 as the reception wireless LAN access points.

The transmission instruction unit 13 instructs the transmission wireless LAN access point 23 to transmit the signal (S14), and the transmission wireless LAN access point 23 receives the instruction (S20). It should be noted that the transmission instruction (S14) includes the timing (namely the time point of the transmission of the signal) specified by the timing specification unit 11.

The reception wait instruction unit 15 instructs the reception wireless LAN access points 21, 22, and 24 to wait for the reception of the signal (S16), and the reception wireless LAN access points 21, 22, and 24 receive the instruction (S30). It should be noted that the reception wait instruction (S16) includes the timing (namely the time point of the start of the wait for the reception of the signal) specified by the timing specification unit 11.

Referring to FIGS. 4 and 7, when the specified timing is reached, the transmission wireless LAN access point 23 transmits the signal in the channel 44$ch$ (S22), and the reception wireless LAN access points 21, 22, and 24 start waiting for the reception of the signal (S32). In other words, the reception wireless LAN access points 21, 22 and 24 carry out the RF scan so as to receive the signal in the channel 44$ch$. Finally, the reception wireless LAN access point 24 receives the signal (S34), and determines that the reception wireless LAN access point 24 is neighboring the transmission wireless LAN access point 23.

On this occasion, it should be noted that a period in which the reception wireless LAN access point 24 can receive the channel 44$ch$ (a period in which the channel 48$ch$ for the normal operation cannot be used) is limited to a short period from the transmission of the signal by the transmission wireless LAN access point 23 (S22) to the reception of the signal by the reception wireless LAN access point 24 (S34) (refer to FIG. 4).

Then, the transmission access point specification unit 12 specifies the wireless LAN access point 24 that has not transmitted the signal (Yes in S10) as the transmission wireless LAN access point (S12) (refer to FIG. 8). The reception access point specification unit 14 specifies the wireless LAN access points 21, 22, and 23 other than the wireless LAN access point 24 as the reception wireless LAN access points.

The transmission instruction unit 13 instructs the transmission wireless LAN access point 24 to transmit the signal (S14), and the transmission wireless LAN access point 24 receives the instruction (S20). It should be noted that the transmission instruction (S14) includes the timing (namely the time point of the transmission of the signal) specified by the timing specification unit 11.

The reception wait instruction unit 15 instructs the reception wireless LAN access points 21, 22, and 23 to wait for the reception of the signal (S16), and the reception wireless LAN access points 21, 22, and 23 receive the instruction (S30). It should be noted that the reception wait instruction (S16) includes the timing (namely, the time point of the start of the wait for the reception of the signal) specified by the timing specification unit 11.

Referring to FIGS. 4 and 8, when the specified timing is reached, the transmission wireless LAN access point 24 transmits the signal in the channel 48*ch* (S22), and the reception wireless LAN access points 21, 22, and 23 start waiting for the reception of the signal (S32). In other words, the reception wireless LAN access points 21, 22 and 23 carry out the RF scan so as to receive the signal in the channel 48*ch*. Finally, the reception wireless LAN access points 21, 22, and 23 receive the signal (S34), so that the reception wireless LAN access points 21, 22, and 23 are determined to neighbor the transmission wireless LAN access point 24.

Finally, the transmission access point specification unit 12 has specified all the wireless LAN access points 21, 22, 23, and 24 connected to the wireless LAN controller 10 one at a time as the transmission wireless LAN access point (No in S10), and finishes the processing.

The wireless LAN access points 21, 22, and 23 neighboring the reception wireless LAN access point 24 can be detected according to the embodiment of the present invention.

Moreover, the reception wireless LAN access point 24 cannot use the channel 48*ch* usually used by the reception wireless LAN access point 24 only for the short period from the transmission of the signal by the transmission wireless LAN access points 21, 22, and 23 (S22) to the reception of the signal by the reception wireless LAN access point 24 (S34) according to the embodiment of the present invention. Thus, the operation of the reception wireless LAN access point 24 is practically unobstructed.

It should be noted that if the reception wireless LAN access point can start waiting for the reception of the signal responsive to (simultaneously with, for example) the time point at which the transmission wireless LAN access point transmits the signal, the timing specification unit 11, the transmission instruction unit 13, and the reception wait instruction unit 15 may be omitted. The transmission wireless LAN access point may determine the time point of the transmission of the signal, and may notify the reception wireless LAN access points of the time point, for example. Alternatively, the reception wireless LAN access point may determine the time point of starting the wait for the reception of the signal, and may notify the transmission wireless LAN access point of the time point.

Moreover, though the wait for the reception of the signal is started simultaneously with the time point of the transmission of the signal according to the embodiment of the present invention, the wait may not be started simultaneously. The wait for the reception of the signal only need to be started responsive to the time point of the transmission of the signal.

For example, the wait for the reception of the signal may be started after the time point of the transmission of the signal from the transmission wireless LAN access point, and before the reception of the signal by the reception wireless LAN access points.

Alternatively, the wait for the reception of the signal may be started slightly before the time point of the transmission of the signal from the transmission wireless LAN access point. It should be noted if the start is too earlier than the transmission of the signal, the normal operation of the reception wireless LAN access point is obstructed, and the wait for the reception of the signal is thus set to start "slightly" before the timing.

Moreover, the above-described embodiment can be realized in the following way. A computer is provided with a CPU, a hard disk, and a media (such as a floppy (registered trade mark) disk and a CD-ROM) reader, and the media reader is caused to read a medium recording programs realizing the above-described respective components such as the respective components of the wireless LAN controller 10 and the wireless LAN access points 21, 22, 23, and 24, thereby installing the programs on the hard disk. The above-described functions can also be realized in this way.

What is claimed is:

1. A wireless LAN control device connected to a plurality of wireless LAN access points, comprising:
    a transmission access point specification unit that specifies one of the plurality of wireless LAN access points as a transmission wireless LAN access point that transmits a signal; and
    a reception access point specification unit that specifies all the wireless LAN access points other than the transmission wireless LAN access point out of the plurality of wireless LAN access points as reception wireless LAN access points that start waiting for reception of the signal responsive to a time point of the transmission,
    wherein, when at least one of the reception wireless LAN access points has received the signal, the at least one of the reception wireless LAN access points is determined to neighbor the transmission wireless LAN access point.

2. The wireless LAN control device according to claim 1, wherein the transmission access point specification unit specifies all the plurality of wireless LAN access points one at a time as the transmission wireless LAN access point.

3. The wireless LAN control device according to claim 1, comprising:
    a transmission instruction unit that instructs the transmission wireless LAN access point to transmit the signal; and
    a reception wait instruction unit that instructs the reception wireless LAN access points to wait for the reception of the signal.

4. The wireless LAN control device according to claim 1, wherein the wait for the reception of the signal starts simultaneously with the transmission of the signal.

5. The wireless LAN control device according to claim 1, wherein the wait for the reception of the signal starts before the reception of the signal by the at least one of the reception wireless LAN access points.

6. The wireless LAN control device according to claim 1, wherein the wait for the reception of the signal is to enable the at least one of the reception wireless LAN access points to receive a channel for the signal.

7. The wireless LAN control device according to claim 1, wherein the signal is a beacon frame.

8. A wireless LAN communication system, comprising:
    a transmission wireless LAN access point that transmits a signal; and
    a reception wireless LAN access point that starts waiting for reception of the signal responsive to a time point of the transmission,
    wherein, when the reception wireless LAN access point has received the signal, the reception wireless LAN access point is determined to neighbor the transmission wireless LAN access point.

\* \* \* \* \*